(12) United States Patent
Dean

(10) Patent No.: US 7,578,870 B2
(45) Date of Patent: Aug. 25, 2009

(54) FLUID SEPARATING DEVICE

(75) Inventor: W. Clark Dean, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 859 days.

(21) Appl. No.: 11/016,556

(22) Filed: Dec. 17, 2004

(65) Prior Publication Data

US 2006/0130661 A1   Jun. 22, 2006

(51) Int. Cl.
*B01D 19/00*   (2006.01)

(52) U.S. Cl. .............................. 95/241; 95/261; 95/258; 96/208; 96/209; 96/202; 96/155; 415/169.1; 415/1; 2/458; 2/102; 429/17; 417/313

(58) Field of Classification Search .................. 96/208, 96/209, 210, 211, 212, 202, 155; 95/261, 95/254, 258, 241; 415/169.1
See application file for complete search history.

(56) References Cited

U.S. PATENT DOCUMENTS

| 3,251,303 | A |   | 5/1966  | Mason et al. |
| 3,977,850 | A |   | 8/1976  | Hill |
| 4,067,814 | A |   | 1/1978  | Surakka et al. |
| 4,135,898 | A |   | 1/1979  | Rosengard |
| 4,358,299 | A |   | 11/1982 | Jensen et al. |
| 4,447,189 | A |   | 5/1984  | Jensen et al. |
| 4,767,281 | A |   | 8/1988  | Sailer |
| 4,775,292 | A |   | 10/1988 | Jensen et al. |
| 4,815,932 | A |   | 3/1989  | Thomas |
| 4,975,192 | A |   | 12/1990 | Uda et al. |
| 5,000,766 | A | * | 3/1991  | Yano et al. ................ 96/196 |
| 5,476,537 | A |   | 12/1995 | Yi et al. |
| 5,672,187 | A |   | 9/1997  | Rock et al. |
| 6,129,523 | A |   | 10/2000 | Ruhnke |
| 6,349,412 | B1 |  | 2/2002  | Dean |
| 6,402,799 | B1 |  | 6/2002  | Kokubo et al. |
| 6,431,461 | B1 |  | 8/2002  | Ruhnke |

(Continued)

FOREIGN PATENT DOCUMENTS

DE   103 46 196 A1   4/2004

(Continued)

OTHER PUBLICATIONS

European Search Report relating to Application No. EP 05 25 7608 dated May 23, 2006.

*Primary Examiner*—Duane Smith
*Assistant Examiner*—Douglas J Theisen
(74) *Attorney, Agent, or Firm*—Carlson, Gaskey & Olds PC

(57) ABSTRACT

A fluid separator device allows for introducing air entrained in a liquid flow to a centrifugal pump in a manner that will not allow the pump to become gas bound. One example device designed according to this invention includes a housing having an inlet and an outlet downstream of the inlet. An air chamber is positioned on an opposite side of the inlet from the outlet. An air flow passage allows air from the air chamber to be introduced near a rotor assembly input of a centrifugal pump such that relatively small air bubbles are introduced to the liquid flow through the rotor assembly in a manner that prevents the air bubbles from recollecting into a larger bubble that would otherwise interfere with the centrifugal pump operation.

22 Claims, 3 Drawing Sheets

U.S. PATENT DOCUMENTS 6,629,821 B1 10/2003 Yokota et al.
7,118,819 B2 * 10/2006 Grasso ........................ 429/19
2002/0164512 A1 11/2002 Grasso
2003/0232228 A1 12/2003 Grasso

FOREIGN PATENT DOCUMENTS

GB 740815 11/1955

* cited by examiner

US 7,578,870 B2

FLUID SEPARATING DEVICE

FIELD OF THE INVENTION

This invention generally relates to separating gas from liquid in a fluid mixture so that the gas does not interfere with operation of a centrifugal pump.

DESCRIPTION OF THE RELATED ART

Various centrifugal pump configurations are known. In each, there is the possibility for a volume of gas or air to enter the pump and interfere with the ability of the rotor assembly to generate the centrifugal forces necessary to create suction. Such a condition is sometimes referred to as a "gas bound" pump. A gas bound pump stops pumping and measures must be taken to correct such a condition.

There are a variety of uses for centrifugal pumps. One particular application for such centrifugal pumps is in a fuel cell assembly. The porous nature of known fuel cell plates results in air being continuously mixed into the coolant flow at a rate of approximately 3% by volume. During system startup, significantly more air can be present. The centrifugal pumps used in fuel cell coolant loops typically cease functioning if more than 2% air is entrained in the liquid introduced to the pump. Accordingly, fuel cell assemblies require a separation of the air from the liquid for the pump to continue operating as desired.

Various attempts at separating gas from liquid in a fluid mixture to avoid having a gas bound pump are known. A variety of phase separation techniques at the inlet of a pump have been proposed. Typical phase separators include a vessel that allows air to be collected near a top of the separator while the liquid moves to the bottom so that it can be delivered, essentially free of air, to the pump inlet. An air compressor is often used to create suction that will remove the air from the top of the separator and vent it to atmosphere or provide it to another part of a relevant system. In such situations, a level control valve is required to close off the air flow to prevent any water from flowing into the compressor.

Another arrangement includes an ejector that is used to create low pressure at the top of a separator to direct the air or water to a system accumulator that is normally vented to atmosphere. One advantage to such an arrangement is that the ejector is compatible with air and water and that eliminates the need for a level control valve.

Both of the proposed solutions described above add complexity and expense to the associated pump or system. It is desirable to be able to control the amount of gas flowing into a centrifugal pump without requiring expensive separator or ejector devices. This invention addresses that need.

SUMMARY OF THE INVENTION

In general terms, this invention is a device for separating a gas from a liquid in a fluid mixture to control the manner in which such gas flows into a device such as a centrifugal pump.

One fluid separator device designed according to this invention includes a housing that has an inlet and an outlet downstream of the inlet. An air chamber is on an opposite side of the inlet. An air flow passage has an input side in communication with the air chamber and an output side adjacent the housing outlet. The inlet has a first flow dimension, the outlet has a second flow dimension and the air flow passage outlet has a third flow dimension that is less than at least one of the first or second dimensions.

In one example, the air flow passage comprises a tube extending through the housing having a first end located within the air chamber and a second end positioned adjacent a rotor of a pump associated with the fluid separator device. The air flow tube allows for introducing small bubbles of air into the liquid flow created by the rotor assembly in a manner that the air bubbles cannot accumulate into an amount of air (i.e., a large bubble) that could possibly interfere with the pump operation (i.e., place the pump into a gas bound condition.)

In one example, the fluid separator device has a selectively opened second inlet downstream of the first inlet. The second inlet allows for selectively introducing liquid to the outlet of the housing and the inlet of a pump to create sufficient pressure to start the pump operation even when a large volume of air is first introduced to the fluid separator housing inlet.

One example assembly incorporating a disclosed fluid separator device comprises a vest used to provide warmth or cooling to an individual.

Another example use of a disclosed fluid separator device is within a fuel cell assembly. In one example, a fuel cell power stack assembly has an output in fluid communication with the inlet to the fluid separator device housing. The fluid separator device facilitates maintaining appropriate flow within the fuel cell arrangement, which typically includes some air entrained in a coolant liquid flow.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
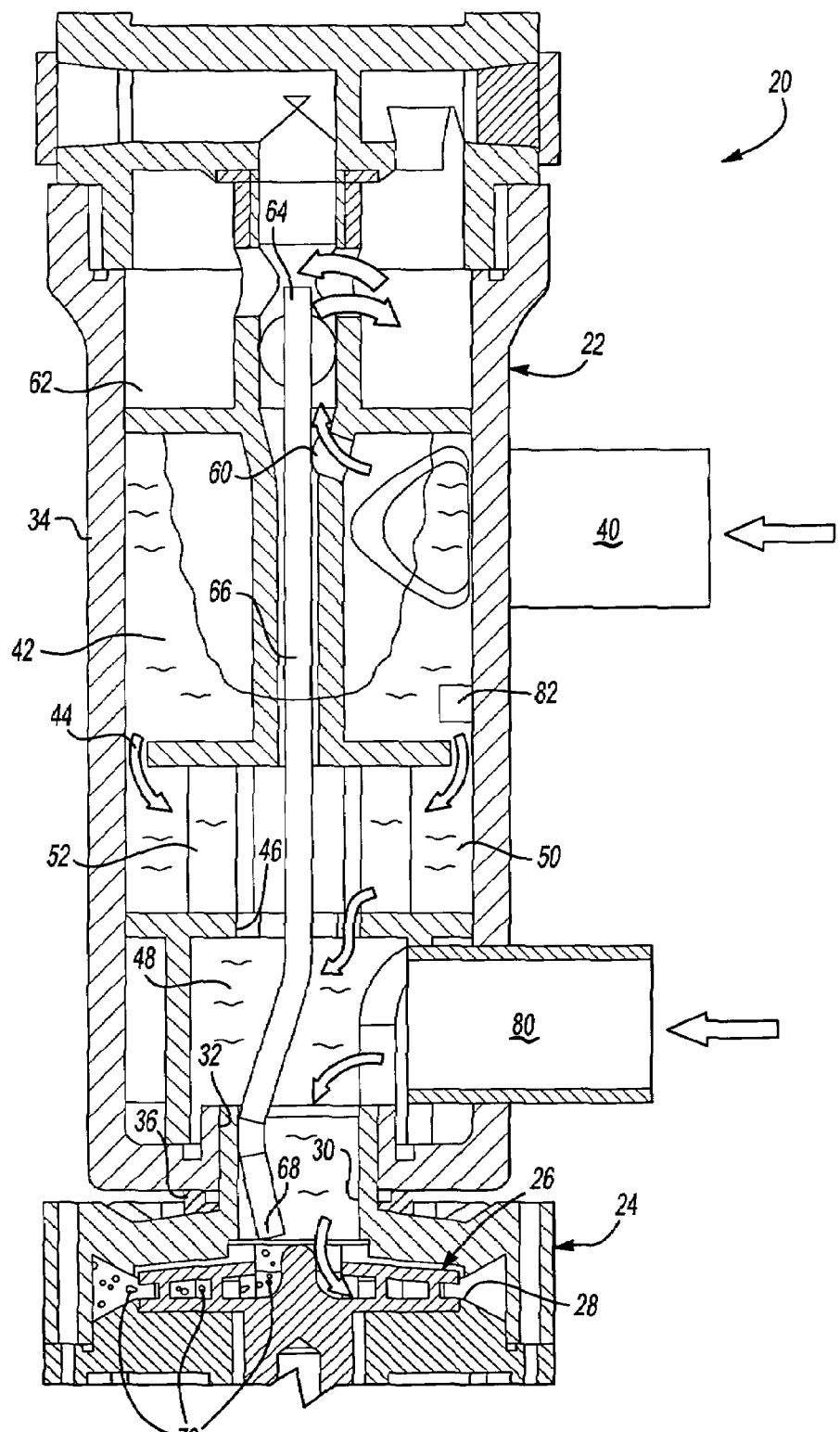
FIG. 1 is a cross-sectional illustration of an example fluid separator device designed according to an embodiment of this invention associated with a centrifugal pump, which is only partially shown.

FIG. 1 shows a centrifugal pump assembly 20 having a fluid separator device portion 22 and a centrifugal pump portion 24. A conventional rotor assembly 26 includes an impeller 28 that creates a fluid flow through the pump portion 24 beginning at a pump inlet 30. Only a portion of the pump 24 is shown and it operates in a known manner.

The fluid separator device portion 22 facilitates preventing large amounts of gas, such as air, from entering the pump portion 24 in a manner that would tend to stop the operation of the pump by interfering with the ability of the rotor assembly 26 to generate the pressures necessary to create the desired fluid flow. The fluid separator device 22 has an outlet 32 associated with the inlet 30 of the pump portion 24. A housing 34 defines the outlet 32. In the illustrated example, a sealing arrangement 36 ensures a fluid-tight seal between the inlet 30 of the pump portion 24 and the outlet 32 of the housing 34.

An inlet 40 to the housing 34 is configured to create a tangential flow within a vortex chamber 42 of the device 22. As known, a tangential flow into such a chamber tends to cause the fluid to swirl in a manner that liquid moves radially outward and gas or air entrained in the liquid tends to move radially inward or toward the center of the chamber 42. The tangential flow also creates a vortex in a known manner. The liquid within the vortex chamber 42 is allowed to flow through a radial gap 44 toward a flow passage 46 so that the liquid can enter a pump inlet chamber 48 of the fluid separator portion 22.

The illustrated example includes a deswirl chamber 50 downstream of the radial gap 44 and upstream of the flow passage 46. The deswirl chamber 50 includes a plurality of vanes 52 arranged in a known manner to interrupt any rotational flow of the liquid within the deswirl chamber 50. The deswirl chamber 50 effectively prevents any gas or air within the vortex chamber 42 from being pulled by a vortex through the flow passage 46 into the pump inlet chamber 48. Accordingly, the pump inlet chamber 48 typically contains only liquid. The pump inlet chamber 48 is in direct fluid communication with the pump inlet 30 so that the fluid flows toward the rotor assembly 26 responsive to pressure created by operation of the pump portion 24.

Near a center of the vortex chamber 42, an air vent 60 allows the air from the center of the vortex chamber 42 to pass as schematically shown by the arrows into an air chamber 62 of the fluid separator device 22. An input 64 of an air flow passage 66 is in direct fluid communication with the air chamber 62 so that air from the chamber can pass into and through the air flow passage 66. An output 68 of the air flow passage 66 is positioned adjacent the outlet 32 of the housing 34. In the illustrated example, the output 68 is immediately adjacent the rotor assembly 26 of the pump portion 24.

The air flow passage 66 can pass the maximum air flow rate using a much smaller internal dimension than the flow dimension of the inlet 40 or the outlet 32. A flow through the air flow passage 66 is sufficient to handle the gas fraction of mixed gas and liquid entering the inlet 40. In one example, the airflow passage 66 comprises a constant diameter tube.

In the illustrated example, a plurality of relatively small air bubbles 70 are introduced directly adjacent the impeller portion 28 so that the air bubbles 70 are swept into the fluid flow through the pump 24 in a manner that prevents the air entering the pump from collecting into a volume that could interfere with the operation of the pump portion 24. The positioning of the output 68 of the passage 66 allows for effectively shedding the air from the vortex chamber 42 directly to the pump inlet so that there is no danger of the pump portion 24 becoming gas bound. The individual bubbles 70 that are shed from the air flow passage 66 are not able to recollect into a large bubble because of the liquid flow created by the rotor portion 26. The small bubbles 70 are effectively swept through the rotor instead of being able to migrate toward a center to become a larger bubble that may otherwise interfere with pump operation.

The illustrated example also includes a second inlet 80 in direct fluid communication with the pump inlet chamber 48. The second inlet 80 allows for selectively introducing liquid into the pump inlet chamber 48, which may be especially useful during pump start up conditions. In some circumstances, for example, it may be that the inlet 40 introduces almost all air into the separator housing 34. Under such conditions, it may not be possible to effectively start the pumping action of the pump 24. Accordingly, selectively controlling liquid flow into the inlet 80 under such conditions allows for an initial liquid flow through the pump 24 to create the negative pressure necessary to draw air from the vortex chamber 42 up into the air chamber 62 and through the air flow passage 66 where the air is then introduced to the pump inlet 30 as described above. Once an appropriate amount of liquid flow into the vortex chamber 42 is achieved, the inlet 80 can be selectively closed and all liquid flow into the separator 22 can be through the inlet 40.

The illustration schematically shows a sensor 82 for determining the liquid level in the vortex chamber 42. In the event that the sensor 82 indicates that the liquid level is too low (i.e., too much air is in the vortex chamber 42), the inlet 80 preferably is opened to introduce liquid to the pump inlet chamber 48 until a sufficient liquid level is achieved within the vortex chamber 42, for example.

In one example, the inlet 80 remains open for most of the operation of the pump assembly 20. In another example, the inlet 80 is only used during start up conditions. Those skilled in the art who have the benefit of this description will be able to select appropriate operation parameters for controlling liquid flow into the inlet 80 to meet the needs of their particular situation.

Under circumstances where all air is removed from the separator portion 22, liquid is allowed to enter the air chamber 62 and flow through the air flow passage 66.

Figure 2:
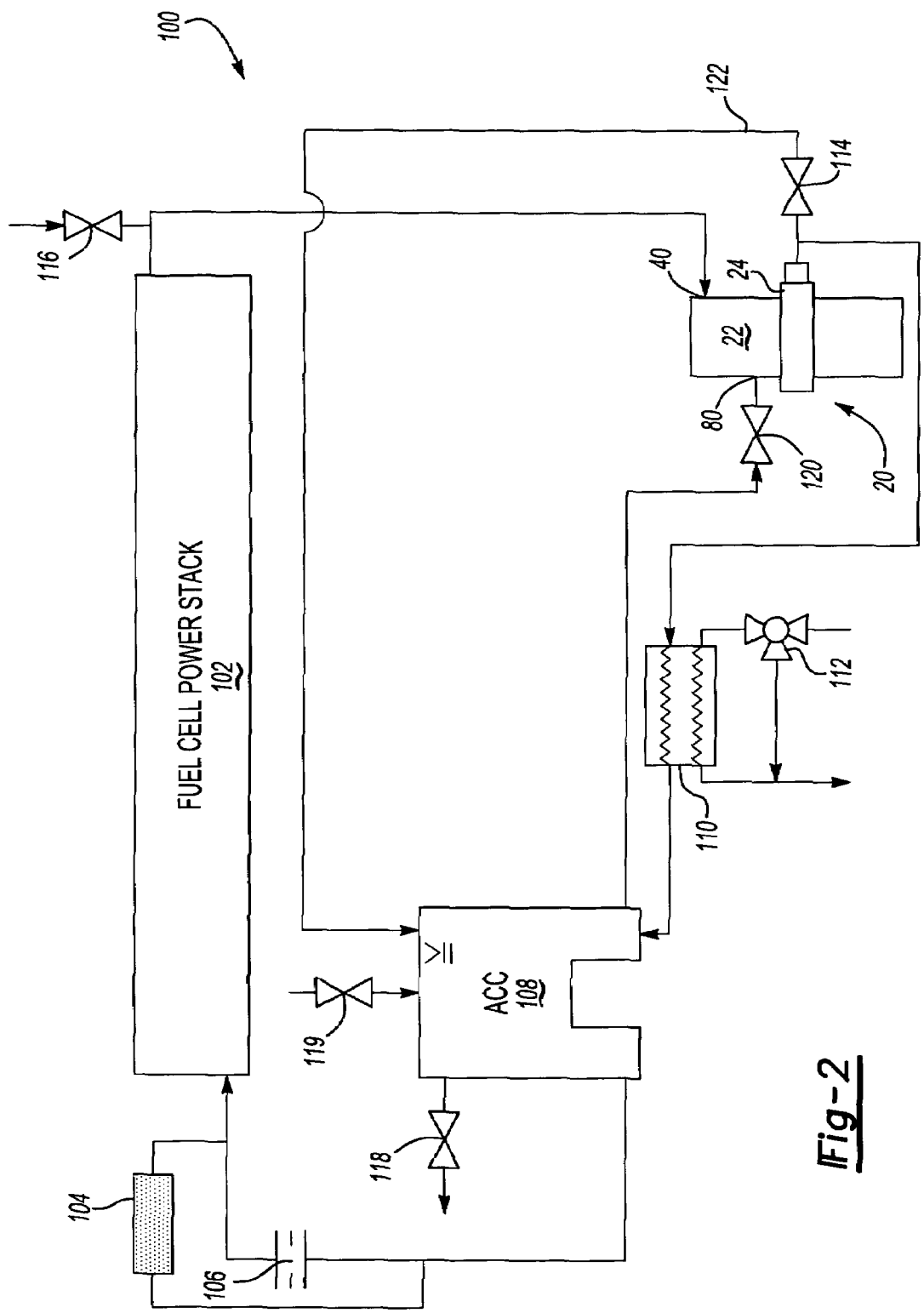
FIG. 2 schematically illustrates a fuel cell assembly incorporating a fluid separator device like the embodiment of FIG. 1.

FIG. 2 schematically shows a fuel cell arrangement 100 that includes a fuel cell power stack assembly 102. In one example, the fuel cell power stack assembly 102 is a polymer electrolyte membrane (PEM) assembly that operates in a known manner. An input to the power stack assembly 102 is coupled to a dimineralizing bed 104 in parallel with an orifice 106 that operate in a known manner to control fluid flow from a accumulator 108 into the power stack assembly 102.

The output of the power stack assembly is coupled to the inlet 40 of the centrifugal pump assembly 20, which is the same as the embodiment of FIG. 1 in this example. The output of the pump assembly 20 is normally directed through a heat exchanger 110 where temperature is controlled using a flow control valve 112 in a known manner. Fluid flowing through the heat exchanger 110 is introduced to the bottom of the accumulator 108. Under some conditions, a bypass valve 114 is utilized to direct flow from the pump assembly 20 directly to a top portion of the accumulator 108 to satisfy criteria that will be described below.

The illustrated example also includes a control valve 116 that can be used to selectively vent the system and allow coolant liquid (i.e., water) to drain out of the power stack assembly 102 into the accumulator 108. Another control valve 118 allows the accumulator 108 to be vented to atmosphere and another control valve 119 allows the accumulator to act as a sump drain for the power stack assembly 102. The general operation of a fuel cell assembly as schematically shown is known.

The fuel cell assembly 100 operates the power stack assembly 102 at a pressure that is less than ambient so that hydrogen used in the fuel cell reaction is appropriately contained. At system start up, water must be delivered from the accumulator 108 to displace air within the power stack assembly 102 without subjecting the power stack assembly 102 to positive pressure. According to the illustration, the heat exchanger 110 and the pump assembly 20 are located below the accumulator such that they will be full of water at system start up.

In the illustrated example, a purge valve 120 is opened to allow liquid to flow from the accumulator 108 into the inlet 80 of the separator portion 22. The bypass valve 114 is opened at the same time and the pump portion 24 is turned on. A purge flow of water is drawn from the accumulator 108 into the pump portion 24 through the inlet 80 and the pump inlet chamber 48 of the separator portion 22. That flow is delivered back to the accumulator 108 primarily through the conduit 122 extending between the bypass valve 114 and the accumulator 108. A lesser amount of fluid is provided through the heat exchanger 110 to the accumulator 108.

The suction developed at the pump inlet 30 reduces the pressure in the separator portion inlet chamber 42 and at the input 64 of the air flow passage 66. Any liquid (i.e., water) that is in the outlet line of the power stack assembly 102 is quickly pumped to the accumulator allowing air from the power stack assembly 102 to enter the low pressure housing 34. The low pressure associated with the fluid flow through the pump portion 24 draws water from the accumulator 108 into the power stack assembly 102, eventually displacing much of the air in the power stack assembly water flow passages. The displaced air with some water carryover is delivered to the vortex chamber 42 of the separator portion 22. Such air is eventually drawn into the air chamber 62 and through the air flow passage 66 where it is introduced into the fluid flow through the pump rotor 26. Under these conditions, water through the inlet 80 is flowing at a high velocity past the end (i.e., output 68) of the air flow passage 66, which sweeps the air bubbles 70 into the pump portion rotor assembly 26 and out of the pump outlet where the air is returned into a mixed flow stream of fluid that may contain about 30% air and about 70% water by volume, to the top of the accumulator 108 through the bypass conduit 122. A lesser amount of such a fluid mixture is provided to the bottom of the accumulator 108 through the heat exchanger 110.

After sufficient time, the power stack assembly 102 becomes effectively completely filled with water and the flow into the inlet 40 of the separator portion 22 changes from almost all air at start up to mostly coolant (i.e., water) under normal operating conditions. Accordingly, the housing 34 which initially had water in the pump inlet chamber and air in the vortex chamber 42 and the air chamber 62 (and the deswirl chamber 50 under some conditions) becomes almost completely filled with water. Under these conditions, the purge valve 120 can be closed to prevent further liquid input to the inlet 80. At the same time, the bypass valve 114 can be closed allowing the full suction of the pump to be applied to the mixed flow inlet 40 and allowing 100% of the pump outlet flow to be directed through the heat exchanger 110 and back to the accumulator 108.

Controlling the valve 120 to selectively open or close the inlet 80 can be based on known operating parameters of the fuel cell system 100 or input from dedicated sensors designed to provide liquid level indications. Those skilled in the art who have the benefit of this description will be able to select appropriate control strategies for their particular situation.

As known, PEM fuel cell power stack assemblies typically operate with about 3% air by volume within the liquid flow through the system. As the fuel cell assembly 100 operates, the mixture of air and water enters the vortex chamber 42 tangentially. As described above, the water fraction tends to cling to the housing wall and the air fraction tends to move toward the center of the chamber where it rises through the vent 60 into the air chamber 62. The liquid water flows through the radial gap 44 and the flow passage 46 to the pump inlet chamber 48 after passing through the deswirl chamber 50 where the vanes 52 interrupt any rotational motion of the water, which prevents air from being pulled by a vortex into the pump inlet chamber 48. The suction from the pump creates a pressure differential that drives the water from the deswirl chamber 50 through a flow passage 46 into the pump inlet chamber 48 and through the pump inlet 30. The pressure drop associated with the water flow through flow passage 46 provides the necessary pressure difference to draw the full air flow rate through the air flow passage 66. This flow is sufficient for handling the gas fraction of mixed gas and liquid entering the inlet 40.

The low pressure at the end 68 of the air flow passage 66 draws air from the air chamber 62 into the inlet 64 where the air eventually mixes with the liquid at the inlet 32 to the rotor assembly 26. The smaller air bubbles 70 are then swept through the pump and delivered back to the accumulator through the heat exchanger. Eventually, air rises to the top of the water in the accumulator 108 and can be vented to atmosphere in a known manner.

Figure 3:
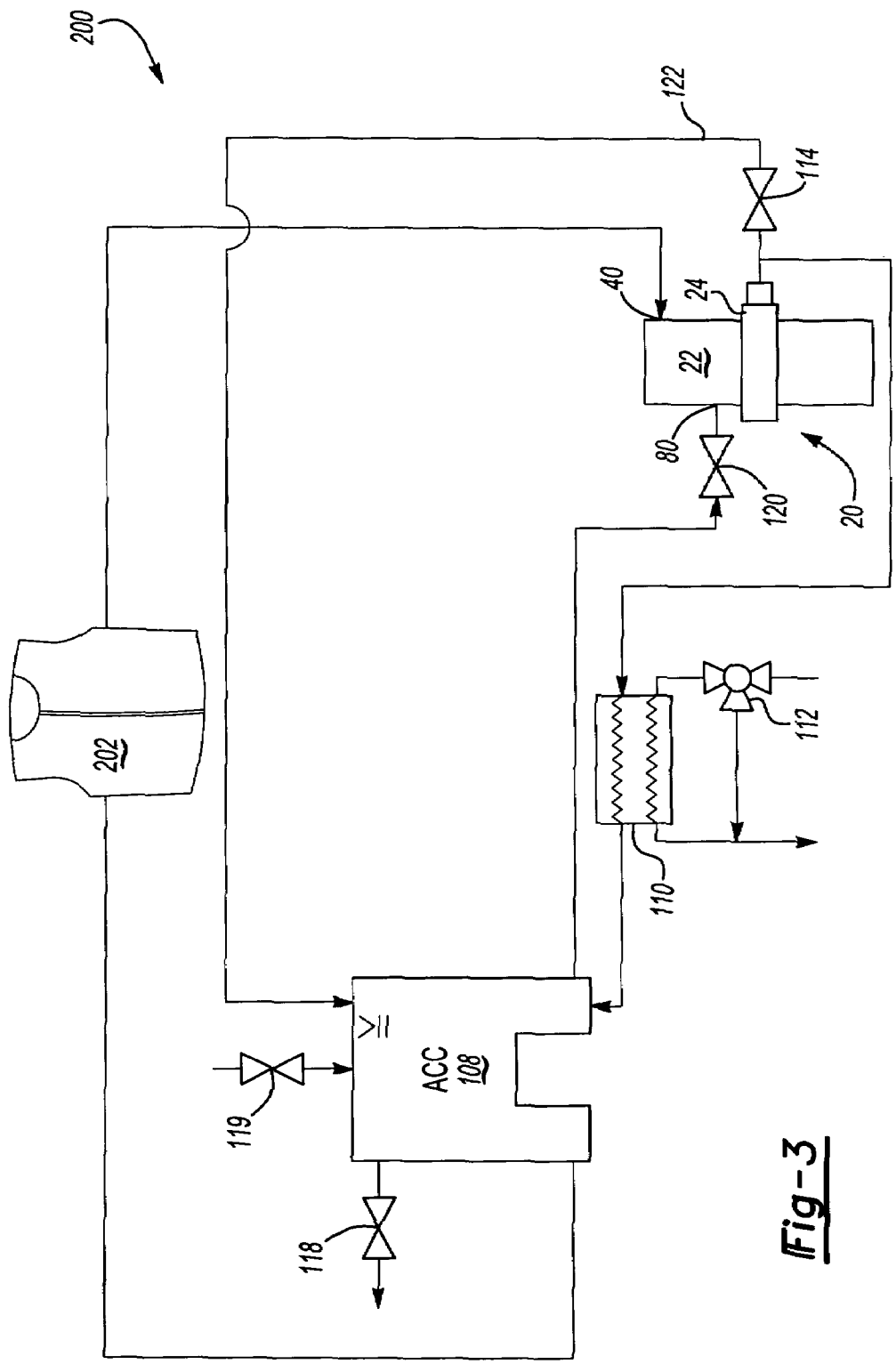
FIG. 3 schematically illustrates a vest assembly incorporating a fluid separator device like the embodiment of FIG. 1.

FIG. 3 schematically shows another example assembly 200 that incorporates a fluid separator device portion 22 as described above. The assembly 200 includes a temperature-altering vest 202 that is used in one example to provide cooling to an individual wearing the vest 202. A variety of known vest configurations that utilize fluid flow through the vest 202 may be used in such an assembly. In another example, a vest 202 provides heat or warming effects. The fluid separator device portion 22 operates in the same manner as described above to handle air that is entrained in the fluid flowing to or from the vest 202.

With one embodiment, air or another gas can be continuously ingested into the separator portion 22 in a ratio of up to 20% by volume without the possibility for interfering with the pump operation. In one example, the inventive arrangement can handle up to 20% by volume gas without overpowering the ability of the air flow passage 66 to deliver the air flow through the pump in a manner that does not interfere with pump operation. If an individual air slug were to take up most of the volume within the housing 34, the inlet 80 can be opened to allow liquid flow into the pump, which will prevent the pump from becoming gas bound because of the operation described above.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fluid separator device, comprising:
a housing having an inlet, an outlet downstream of the inlet, an air chamber on an opposite side of the inlet, and an air flow passage having an input side in communication with the air chamber and an output side near the outlet, the inlet having a first flow dimension, the outlet having a second flow dimension and the air flow passage output having a third flow dimension that is less than at least one of the first or second dimensions.

2. The device of claim 1, wherein the first flow dimension and the third flow dimension are configured such that an amount of air that enters the inlet is released from the air flow passage output in smaller increments than the amount allowed to enter the inlet.

3. The device of claim 1, wherein the air flow passage comprises a constant diameter tube.

4. The device of claim 1, including a second inlet downstream of the inlet between the inlet and the outlet, the second inlet being selectively opened to allow liquid flow into the housing.

5. The device of claim 1, including a vortex chamber in direct fluid communication with the inlet, a de-swirl chamber downstream of the vortex chamber and a liquid passage that allows liquid from the de-swirl chamber to flow to the outlet.

6. The device of claim 5, wherein the de-swirl chamber includes a plurality of vanes positioned to interrupt a rotational flow of fluid flowing from the vortex chamber toward the liquid passage.

7. The device of claim 5, including a pump inlet chamber between the liquid passage and the outlet and including a second inlet that selectively allows liquid to enter directly into the pump inlet chamber.

8. The device of claim 1, including a pump having a rotor near an inlet of the pump and wherein the air flow passage output is adjacent the rotor such that air flowing through the output is swept into a flow caused by the rotor.

9. A method of introducing a fluid that contains gas and liquid into a centrifugal pump that has a rotor, comprising the steps of:
   receiving the fluid at a first position spaced from the rotor;
   separating the gas from the liquid of the received fluid; and
   directing an amount of gas from the received fluid to a second position adjacent the rotor in smaller increments than the amount received at the first position.

10. The method of claim 9, including selectively receiving a volume of liquid at a second location downstream from the first position and closer to the rotor.

11. The method of claim 10, including directing the received gas to the second position simultaneous with allowing the selectively received liquid to flow through the rotor.

12. The method of claim 10, including determining when an amount of gas directed toward the rotor is below a selected threshold and then preventing liquid flow at the second location.

13. An assembly for controlling fluid flow, comprising:
   a first component that has at least one portion through which a fluid selectively flows; and
   a pump device having a pump portion that draws fluid from the first component and directs fluid toward the first component and a fluid separator portion having a separator inlet in fluid communication with an outlet of the first component, a separator outlet on one side of the separator inlet that is in communication with an inlet of the pump portion, an air chamber on an opposite side of the separator inlet and an air flow passage having an air flow inlet in communication with the air chamber and an outlet near the separator outlet, the air flow passage having a flow dimension that is smaller than at least one of the separator inlet or the separator outlet.

14. The assembly of claim 13, wherein the first component comprises a vest.

15. The assembly of claim 13, wherein the first component comprises a fuel cell stack.

16. A fuel cell system, comprising:
   a power stack assembly;
   an accumulator for containing a coolant fluid; and
   a pump device in communication with the power stack assembly and the accumulator for selectively directing coolant through the power stack assembly, the pump device having a pump portion and a separator portion having a separator inlet in communication with an outlet of the power stack assembly, a separator outlet in communication with an inlet of the pump portion, an air chamber on an opposite side of the separator inlet and an air flow passage having an input side in communication with the air chamber and an output side near the separator outlet, the air flow passage having a flow dimension that is smaller than a flow dimension of at least one of the separator inlet or the separator outlet.

17. The system of claim 16, wherein the pump portion includes a rotor portion that creates a pressure differential to draw fluid through the pump portion and wherein the air flow passage output is adjacent the rotor portion.

18. The system of claim 16, wherein an amount of air that enters the separator inlet is released from the air flow passage output in smaller increments compared to the amount that enters the separator inlet.

19. The system of claim 16, including a second separator inlet downstream of the separator inlet between the separator inlet and the pump portion inlet, the second separator inlet being selectively opened to allow liquid flow toward the pump portion inlet.

20. The system of claim 19, including a valve between the second separator inlet and the accumulator that is selectively opened to allow liquid to flow from the accumulator directly through the second inlet toward the pump portion inlet.

21. The system of claim 16, wherein the separator portion includes a vortex chamber in direct fluid communication with the separator inlet, a de-swirl chamber downstream of the vortex chamber and a liquid passage that allows liquid from the de-swirl chamber to flow to the separator outlet.

22. The system of claim 21, wherein the de-swirl chamber includes a plurality of vanes positioned to interrupt a rotational flow of fluid flowing from the vortex chamber toward the liquid passage.

* * * * *

UNITED STATES PATENT AND TRADEMARK OFFICE
CERTIFICATE OF CORRECTION

| | | |
|---|---|---|
| PATENT NO. | : 7,578,870 B2 | Page 1 of 1 |
| APPLICATION NO. | : 11/016556 | |
| DATED | : August 25, 2009 | |
| INVENTOR(S) | : W. Clark Dean | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Seventh Day of September, 2010

David J. Kappos
*Director of the United States Patent and Trademark Office*